United States Patent Office 3,199,555
Patented Aug. 10, 1965

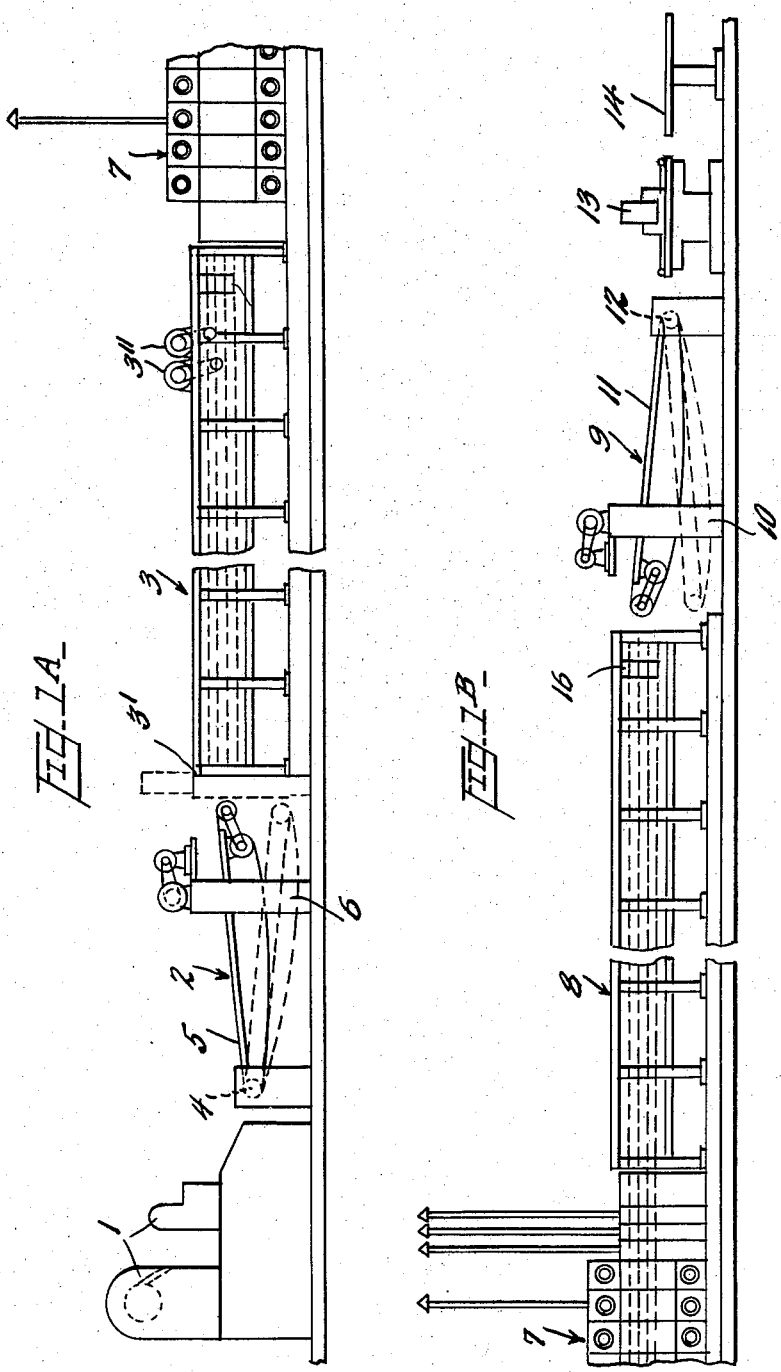

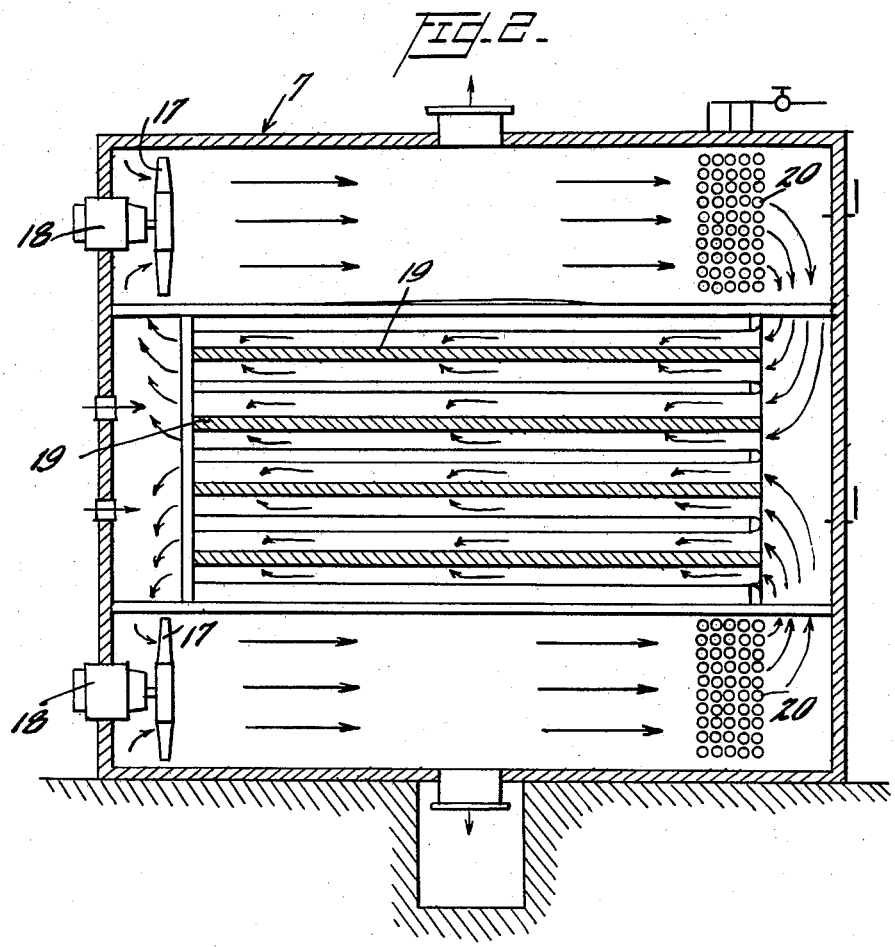

3,199,555
APPARATUS FOR PRODUCING AND DRYING
VENEERS
Robert Hildebrand, Nurtinger Strasse 68, Oberboihingen,
Wurttemberg, Germany
Filed Mar. 6, 1963, Ser. No. 263,336
1 Claim. (Cl. 144—3)

The present invention relates to an apparatus for producing and drying veneer layers and of producing veneer sheets from such layers.

Prior to this invention, this operation was carried out intermittently by an apparatus in which the veneer layers coming from a peeling machine were passed by a common feeding mechanism including an adjustable conveyer to one tier after another of a multiple-tier collecting station which was provided with several horizontal conveyers above each other. While the different tiers of this collecting station were being filled with veneer layers, the layers already collected were passed successively by the respective conveyers of the collecting station by another common feeding mechanism to a cutter or clipper where they were cut into veneer sheets of the desired size. The veneer sheets were then sorted on a sorting table and then stacked in accordance with their different qualities on carriages and moved thereon to one or more multiple-tier driers, where they had to be picked up from the stacks and fed one after the other by a special feeding mechanism to the conveyers in the different tiers of the drier. After being dried, the veneer sheets were successively removed from the drier and stacked at its end on platforms or carriages.

This prior operation had numerous disadvantages, the most important being that the method was carried out intermittently since its continuity was interrupted by the steps of manually sorting the cut sheets and depositing them in stacks before being dried, by then transporting these stacks on carriages to the drier or driers, and by then picking them up from the stacks and feeding them individually to the drier. These interruptions in the continuous process increased the cost of production of the veneers, and the necessary handling of the veneers before they were dried also increased the danger of damage to the veneers as well as the cost of labor.

It is an object of the present invention to overcome the disadvantages of the above-mentioned method by providing a continuous apparatus for producing veneers which entirely avoids the steps of stacking the veneer sheets prior to the drying and of transporting them to the drier and then again picking them up from the stacks for feeding them into the drier. By omitting these steps and by also avoiding any handling of the veneers, including the sorting thereof, prior to the drying operation, the present invention results in a considerable increase in the speed of production, in less waste and in veneers of a better quality, and in a reduction in the cost of the apparatus, the cost of labor for the required attendants, and the cost of carrying out the entire method. It has further been found according to the invention that by subjecting the entire veneer layer rather than the individual cut sheets to a uniform heat treatment with hot air and by omitting any manipulations of the veneer prior to the drying operation, the danger of the formation of cracks in the veneer is considerably reduced. Since the tensions resulting in the veneer during the drying operation are also better absorbed by the uncut veneer, the new method also reduces the tendency of the veneer to become wavy.

The operation according to the invention generally consists of the steps of peeling off continuously a veneer layer from a section of a trunk, then feeding the veneer layer quickly by means of a pivotally adjustable conveyer to a first of several superimposed horizontal conveyers of a multiple-tier collecting stage and then by means of the latter conveyer to the front end of the first tier of the collecting stage where the front end of the veneer layer actuates a suitable control mechanism, for example, a limit switch or a photoelectric cell which immediately actuates suitable means for tearing or cutting off the veneer layer at the rear end of the tier and for simultaneously reducing the speed of the conveyer of this tier so that the severed veneer layer is then passed into the following corresponding tier of a multiple-tier drier at the low speed which is required for the drying operation. As soon as the first veneer is cut off from the layer coming continuously from the peeling machine, the pivotable conveyor is pivoted to the level of the second tier which is then quickly filled and thereafter severed in the same manner as described with respect to the veneer layer in the first tier. Thus, while one tier of the collecting stage after the other is being quickly filled, the veneer in the first tier is passed slowly into the drier. The number of tiers and conveyers in the collecting stage and the speed at which the veneer layer coming from the peeling machine is fed successively into these tiers depends upon the required drying speed. Thus, if the collecting stage contains, for example, four tiers, the feeding speed of the veneer into each tier should be equal to four times the speed at which each severed veneer layer is passed from each tier into and through the drier. During the period in which the second, third, and fourth tiers of the collecting stage are being filled, the veneer from the first tier is passed into the drier. Similarly, while the third and fourth tiers and again the first tier are being filled, the veneer from the second tier is passed into the drier, and so forth. The conveyor of each tier is therefore driven by a separate motor which, for example, by pole changing, may be driven at two different speeds. It is, however, also possible to provide two motors which are adapted to be connected by suitable clutches for driving the conveyer of each tier alternately at the two different speeds. These clutches may then be controlled by limit switches or photo-electric cells which are actuated by the veneers in each tier in the manner as previously mentioned. After each veneer has passed through the drier which is preferably air-heated, it passes to the corresponding tier of a multiple-tier receiving stage which is structurally similar to the collecting stage and also of the same length, but the conveyers of which in the different tiers are operated in the reverse order to those of the collecting stage and therefore at first receive the veneer at the low speed of the drier until the front end of the veneer in the respective tier actuates a limit switch or the like near the end of the tier, whereby the speed of the conveyer is increased, for example, to four times the drier speed. It then runs at this high speed along another pivotable conveyer to a cutting machine or clipper where the respective veneer layer is cut successively into individual veneer sheets of the desired length which are then passed to a sorting table. When the rear end of the veneer layer of the first tier of the receiving stage reaches the end of this stage, the speed of the conveyer of this tier is changed back to the drying speed to receive another veneer from the drier, and at the same time the pivotable conveyer is pivoted to the level of the second tier which then quickly feeds the next veneer to the cutter, whereupon the conveyer of this second tier is also changed back to the low speed of the drier to receive the next veneer therefrom. This procedure may be carried out continuously and entirely automatically as long as desired. After the veneer sheets have been sorted on the sorting table at the end of the entire machine they are either deposited in stacks or immediately transported to the different locations where they are to be used.

The general requisites of an apparatus for carrying out the inventive method are evident from the above description of this method. It comprises a peeling machine for continuously peeling a veneer layer from one trunk section after another, a multiple-tier collecting stage and a similar receiving stage with conveyers in each tier, a pair of adjustable conveyers each of which is pivotable about one end by an elevating device to lift or lower the other end from the level of one tier to that of the next tier of the collecting or receiving stage, a multiple-tier drier between the collecting and receiving stages, likewise with a conveyer in each tier, a cutting machine or clipper for cutting the dried veneer layers coming from each tier of the receiving stage into sheets of the desired sizes, and a sorting table at the end of the apparatus. The apparatus further comprises separate driving means for the individual conveyers, including a motor or motors for driving each conveyer of the collecting and receiving stages alternately at two differernt speeds, and control means for effecting the automatic operation of the entire apparatus including limit switches, photoelectric cells or the like for changing the driving speed of the conveyers of the collecting and receiving stages.

The features and advantages of the present invention will become more clearly apparent from the following detailed description thereof which is to be read with reference to the accompanying drawing which shows in FIGS. 1A and 1B a diagrammatic side view of the two successive parts of the apparatus according to the invention, and FIG. 2 is a cross section of a detail through the drier.

In this drawing, a veneer peeling machine 1 in which a continuous veneer layer is peeled off a trunk section which is rotating between centers is followed by a feeding mechanism 2 for feeding the veneer layer successively to the four tiers of a collecting stage 3 which is provided in each tier with a suitable conveyer, preferably a belt conveyer which is driven by rollers, not shown. This feeding mechanism 2 comprises a belt conveyer 5 which is pivotable about an axis 4 and provided at the end adjacent to the collecting stage 3 with an elevating mechanism 6 which, after one tier of the collecting stage has been filled and the rear end of the veneer in this tier has been torn or cut off at the point 3', is adapted to adjust the front end of the belt conveyer 5 to the level of the next tier to be filled in the collecting stage 3. The highest position to which the front end of conveyer 5 may be adjusted is shown in the drawing in full lines, while the lowest position thereof is indicated in dotted lines. Instead of tearing or cutting off the rear end of the veneer in each tier of the collecting stage from the continuous veneer layer supplied by the peeling machine, it is of course also possible to peel consecutive layers of a certain length which is in accordance with the length of each tier of the collecting stage 3. Since the collecting stage 3 contains, for example, four tiers, the speed at which the veneer layers are fed by the peeling machine 1 and the conveyer 5 successively into one tier after another of the collecting stage amounts to four times the speed at which the veneer layers are conveyed successively from each of these tiers into and through the drier 7. The conveyer belt of each tier of the collecting stage 3 is therefore driven by a separate motor, only two of which are shown at 3", which is adapted to be driven at two different speeds, namely, at the high speed at which each veneer is fed into each tier of the collecting stage and at one fourth of this speed at which the veneers of each tier of the collecting stage are passed into and through the drier 7. For this purpose a limit switch 15 is provided at the end of each tier of the collecting stage which is actuated by the front end of the veneer and then switches the respective conveyer motor 3" to the low speed which is required for the subsequent drying operation.

The drier 7 which is preferably heated by hot air is provided with the same number of tiers as the collecting stage and with conveyers in each stage, all of which are driven at the same speed, preferably by a common motor. Drier 7 is followed by a receiving stage 8 which is similar to the collecting stage 3, except that its conveyer belts are driven by motors, not shown, in the reverse order to the motors 3" of the collecting stage so that the veneers are first fed from the drier 7 into the different tiers of the receiving stage at the low drying speed until their front ends actuate limit switches 16, whereupon the speed of each motor is increased to four times the drying speed to convey each veneer to a pivotably feeding mechanism 9 which is similar to the feeding mechanism 2 and also comprises an elevating mechanism 10, a belt conveyer 11, and a pivot 12 about which the belt conveyer 11 is pivotable from the level of one tier to the other. The belt conveyer 11 then feeds one veneer after the other from the different tiers of the receiving stage at four times the drying speed to a cutting machine or clipper 13 which cuts the veneer layers into sheets of the desired lengths which are then sorted out according to quality and color on a sorting table 14. Thereafter the veneer sheets are either stacked according to quality and color or transported immediately to the places where they are to be used.

In the operation of the apparatus, a veneer layer which is peeled off a trunk section passes to the pivotable conveyer 5 and then, for example, at four times the speed of the conveyers of the drier 7 to one tier after the other of the collecting stage 3. Each conveyer of the collecting stage continues to run at this high speed until the layer thereon has reached the front end of the respective tier, when the front end of the layer actuates the limit switch 15 and thereby changes the speed of the respective conveyer of the collecting stage in accordance with the speed of the drier 7. If the veneer layer is not already supplied from the peeling machine in sections of a length equal to the length of the collecting stage, but is supplied to the latter as a continuous layer, the actuation of limit switch 15 or of a separate limit switch or the like also results in the actuation of a cutter, not shown, which cuts off the rear end of the veneer at the point 3', and thereupon also in the actuation of the elevating mechanism 6 which pivots the free end of the conveyer 5 to the level of the conveyer of the next tier of the collecting stage. Thus, while the veneer in one tier of the collecting stage is passed slowly by its conveyer into the drier 7, the next three tiers of the collecting stage are filled. As soon as each of these following tiers is filled, the same procedure occurs as described with reference to the first tier, namely, that the speed of the conveyer of this tier is changed to the drying speed. As soon as the rear end of the layer in each tier has passed the respective limit switch 15, the conveyer motor 3" of this tier is again switched to the high filling speed, while at the same time the pivotable conveyer 5 returns to the level of this tier to feed the next veneer into the same.

As each veneer emerges slowly from the drier 7, it passes upon the corresponding conveyer of the receiving stage 8 until its front end actuates the limit switch 16, whereby the speed of the conveyer motor is increased to four times the previous speed and passed over the pivotable conveyer 11, which also runs at this high speed, toward and through the cutter or clipper 13, where the long veneer layer is cut up into veneer sheets of the desired lengths which are then moved to the sorting table 14. This completes the automatic operation of the machine. The veneer sheets are then sorted out according to quality and color and either stacked or transported directly to the place where they are to be used.

In order to diagrammatically illustrate the drier 7, as to its internal structure, FIG. 2 shows the cross section of a unit of the drier in which a pair of fans 17 are operated by suitable motors 18 to force the air in the directions indicated by the arrows through the heat exchangers 20 which may comprise a series of pipes through which a hot fluid may be passed. The sheets 19 to be dried are indicated in the center and as shown the air is forced over the sheets as they are individually placed in the drier.

Although my invention has been illustrated and described with reference to the preferred embodiment thereof, I wish to have it understood that it is in no way limited to the details of such embodiment, but is capable of numerous modifications within the scope of the appended claim.

Having thus fully disclosed my invention, what I claim is:

An apparatus for producing and drying veneers comprising a peeling machine for continuously peeling a veneer layer from a trunk section at a high speed, a drier, a plurality of horizontal conveyers disposed at different levels above each other in said drier and movable at a low speed in one direction through said drier, feeding means for feeding said layer at said high speed from said peeling machine in said direction, said feeding means comprising a conveyer and means for pivoting said conveyer about an axis near said peeling machine and disposed at a right angle to said feeding direction to move the free end of said conveyer intermittently to different levels equal to the levels of said conveyers of said drier, a multiple-tier collecting stage intermediate said feeding means and said drier and having a length at least substantially equal to the length of said drier and comprising a plurality of horizontal conveyers disposed at different levels equal to the levels of said drier conveyers, driving means for driving each of said conveyers of said collecting stage alternately at said high speed and said low speed, severing means near the rear end of said collecting stage, said feeding means being adapted to feed said veneer layer at said high speed into a tier of said collecting stage in which the conveyer of said tier while moving at said high speed moves said layer to a point near the front end of said collecting stage, said severing means then adapted to sever said veneer layer at the rear end of said collecting stage from the veneer section inserted into said tier, whereupon said feeding conveyer is pivoted to move its free end to the level of the next tier of said collecting stage and said veneer layer is then fed at said high speed into said next tier and is again severed from the inserted veneer section, said driving means being adapted to feed each veneer section at said low speed from said collecting stage into said drier, control means associated with each tier of said collecting stage and adapted to be actuated by the front end of the veneer section in said tier to actuate said severing means and to change the speed of said driving means from said high speed to said low speed, said control means further adapted to be actuated by the rear end of said veneer section when leaving said tier to change the speed of said driving means from said low speed to said high speed, a multiple-tier receiving stage behind said drier and substantially equal to said collecting stage and also having a plurality of horizontal conveyers, driving means for alternately driving said last conveyers at said low speed for filing each tier of said receiving stage successively with the dried veneers as they pass out of said drier, and at said high speed to move each veneer after being completely inserted in said tier out of said receiving stage, control means adapted to be actuated by the front and rear ends of each veneer in said receiving stage to change the speed of said last driving means from said low speed to said high speed and vice versa, and cutting means subsequent to said receiving stage for cutting each veneer layer into smaller veneer sheets, pivotable feeding means intermediate said receiving stage and said cutting means and substantially equal to said first feeding means and also movable at said high speed for feeding the veneer layers from the different tiers of said receiving stage to said cutting means, and a sorting station at the end of said entire apparatus for sorting out said veneer sheets.

References Cited by the Examiner
UNITED STATES PATENTS

| | | | |
|---|---|---|---|
| 1,809,456 | 6/31 | Streeter. | |
| 1,869,210 | 7/32 | Moore. | |
| 1,903,102 | 3/33 | Farley | 144—281 |
| 1,959,662 | 5/34 | Ellis | 34—205 |
| 2,627,883 | 2/53 | Littley | 144—281 |
| 2,844,174 | 7/58 | Ware et al. | 144—281 |
| 3,087,597 | 4/63 | Jeddeloh. | |

ROBERT C. RIORDON, *Primary Examiner.*

WILLIAM W. DYER, LESTER M. SWINGLE,
*Examiners.*